UNITED STATES PATENT OFFICE.

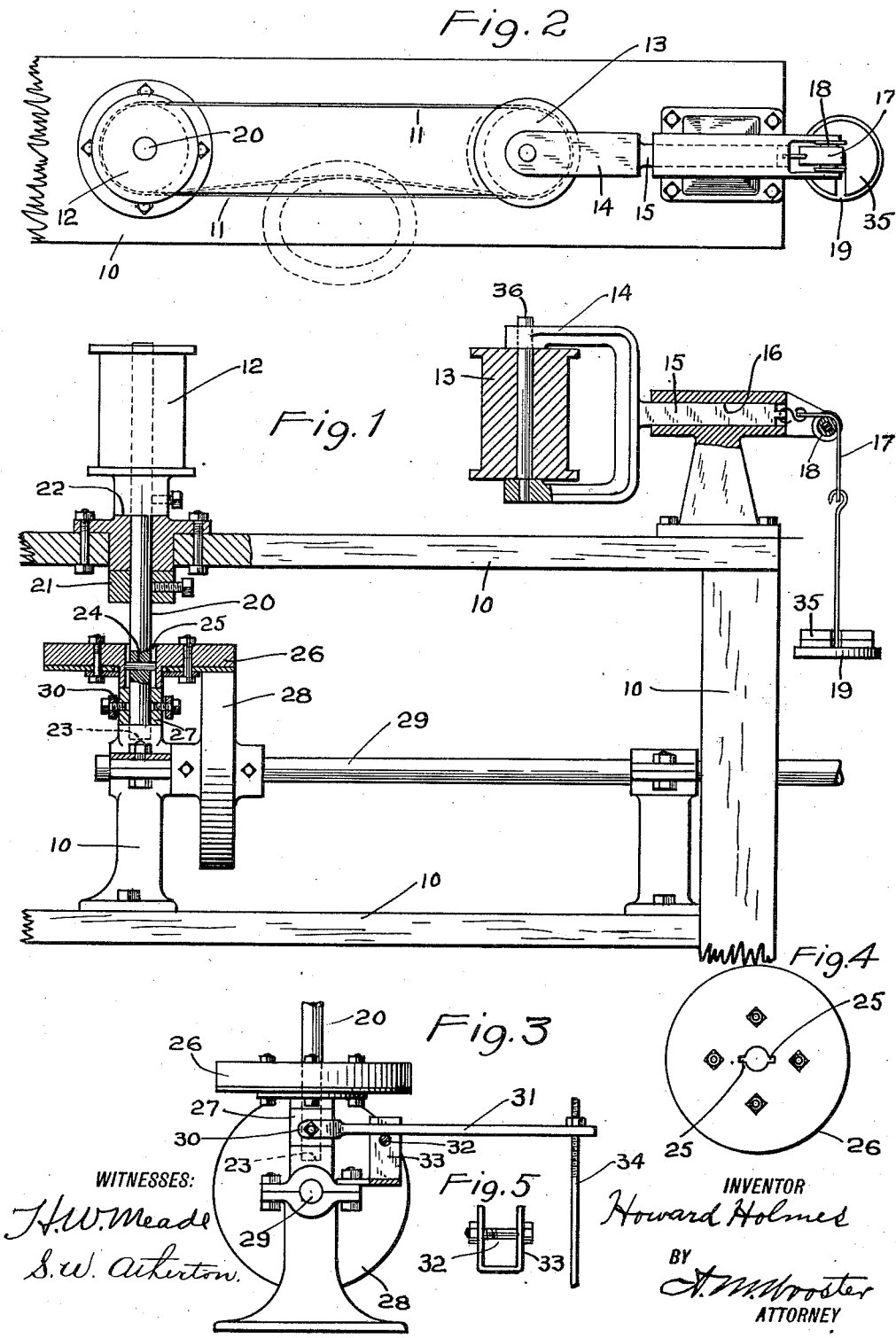

HOWARD HOLMES, OF SOUTH NORWALK, CONNECTICUT.

HAT-POUNCING MACHINE.

1,018,562. Specification of Letters Patent. Patented Feb. 27, 1912.

Application filed May 4, 1911. Serial No. 625,027.

*To all whom it may concern:*

Be it known that I, HOWARD HOLMES, a citizen of the United States, residing at South Norwalk, county of Fairfield, State of Connecticut, have invented an Improvement in Hat-Pouncing Machines, of which the following is a specification.

This invention has for its object to provide a machine for pouncing hats which shall be simple and inexpensive to build and easy to operate and which shall avoid the numerous complications of the pouncing machines now in general use.

With these and other objects in view I have devised the novel hat pouncing machine which I will now describe, referring to the accompanying drawing forming a part of this specification and using reference characters to indicate the several parts.

Figure 1 is a side elevation, partly in longitudinal section, illustrating the operative parts of the machine; Fig. 2 a plan view corresponding therewith; Fig. 3 an end elevation as seen from the left in Fig. 1; Fig. 4 a plan view of the friction disk detached; and Fig. 5 is a view of the fulcrum yoke, detached, as seen from the right in Fig. 3.

10 denotes framework which may be of any suitable construction, 11 the pouncing belt and 12 and 13 fixed and movable rollers by which the pouncing belt is carried. The belts used are endless belts and are preferably slightly elastic. They may be made of rubber, leather, canvas or any suitable material and are provided with operative faces consisting of sand, emery, corundum or any suitable abrading material attached thereto by size or glue in the ordinary manner. Belts of any desired fineness may be used and may be easily changed when required. I have shown the belt as operating in the vertical plane and the rollers as provided with flanges to retain it in place thereon. Movable roller 13 is journaled on a removable pin 36 carried by a yoke 14 having a shank 15 which slides in a housing 16 carried by the framework. A strap 17 passing over a roller 18 is connected to the end of the shank and has at its lower end a carrier 19 for weights 35. Fixed roller 12 is carried by a shaft 20 which is retained against vertical movement by the hub of the roller and a collar 21 which lie in contact with opposite sides of a bearing 22 rigidly secured in the table or bed of the framework. Shaft 20 is stepped in the framework as at 23 and is provided with a cross pin 24 which engages a slot 25 in a friction disk 26 resting upon a collar 27 which in turn rests upon the framework leaving the friction disk free to be moved longitudinally on the shaft but keyed thereto by the cross pin. The friction disk and shaft 20 are driven by a disk 28 on a driving shaft 29 journaled in the framework.

As a means for regulating the speed of the pouncing belt in use and for stopping and starting it without stopping the driving shaft, I provide means for raising the friction disk on shaft 20 partly or wholly out of engagement with the driving disk on shaft 29. Collar 27 is not secured to shaft 20 but the latter turns freely therein.

30 denotes a yoke pivoted to collar 27 and having a lever 31 extending therefrom. This lever is fulcrumed on a cross pin 32 in a yoke 33 which is secured to the framework and has attached at its outer end a rod 34. This rod may extend to a treadle (not shown) operating in the usual manner. It is obvious that when the operator pulls the rod downward the inner end of the lever will be tilted and collar 27 will be raised lightening the contact of the friction disk with the driving disk and reducing the speed of the pouncing belt, and when required carrying the friction disk out of engagement with the driving disk and stopping the rotation of shaft 20 and the movement of the pouncing belt. The required degree of tension of the pouncing belt is provided by placing more or less weights on the carrier attached to strap 17.

The hat to be operated upon is held with more or less pressure, as may be required, against the pouncing belt and is manipulated by hand to place different portions of its surface in contact with the belt, as indicated by dotted lines in Fig. 2.

Having thus described my invention I claim:

1. A pouncing machine comprising a frame, a shaft mounted to rotate therein, a roller secured to said shaft, a second roller adjustably mounted with relation to the first roller, a pouncing belt carried by said rollers, a friction disk longitudinally movable on said shaft, a driving disk engaging said friction disk, whereby said shaft is rotated, and means for moving said friction disk longitudinally of said shaft to vary the frictional pressure between said friction disk and said driving disk.

2. A pouncing machine comprising a frame, a shaft mounted to rotate therein, a roller secured to said shaft, a second roller adjustably mounted with relation to the first roller, a pouncing belt carried by said rollers, a friction disk provided with a central opening through which said shaft is passed, said opening being provided with oppositely disposed grooves, a pin in said shaft having its ends located in said grooves, a driving disk engaging said friction disk, whereby said shaft is rotated, and means for moving said friction disk longitudinally of said shaft to vary the frictional pressure between said friction disk and said driving disk.

3. A pouncing machine comprising a frame, a shaft mounted to rotate therein, a roller secured to said shaft, a second roller adjustably mounted with relation to the first roller, a pouncing belt carried by said rollers, a friction disk connected with said shaft and free to move longitudinally thereof, a driving disk engaging said friction disk, a collar loosely mounted on said shaft and supporting said friction disk, a lever engaging said collar, and means for actuating said lever to raise and lower said collar, whereby the frictional pressure between said friction disk and said driving disk is varied.

In testimony whereof I affix my signature in presence of two witnesses.

HOWARD HOLMES.

Witnesses:
MARION H. ROBERTS,
JOHN B. LAWRENCE.

---

Copies of this patent may be obtained for five cents each, by addressing the "Commissioner of Patents, Washington, D. C."